(12) United States Patent
Uemura

(10) Patent No.: US 6,314,386 B1
(45) Date of Patent: Nov. 6, 2001

(54) SITE ACCESS LOG ANALYZING METHOD AND METHOD OF DISPLAYING THE SAME

(75) Inventor: Fumiaki Uemura, Tokyo (JP)

(73) Assignee: Venture Union Inc., Tokyo (JP)

( * ) Notice: Subject to any disclaimer, the term of this patent is extended or adjusted under 35 U.S.C. 154(b) by 0 days.

(21) Appl. No.: 09/172,804

(22) Filed: Oct. 14, 1998

(30) Foreign Application Priority Data

Oct. 15, 1997 (JP) ................................... 9-297807

(51) Int. Cl.7 .................................................. G06F 13/00
(52) U.S. Cl. ......................... 702/186; 345/348; 345/349; 345/356; 345/440; 345/966
(58) Field of Search .................... 702/186, 182, 702/172; 713/200, 201; 714/47; 705/44; 709/103, 255; 707/100, 103; 340/937; 700/19; 345/440, 356, 966, 348, 349

(56) References Cited

U.S. PATENT DOCUMENTS

| | | | |
|---|---|---|---|
| 4,961,224 * | 10/1990 | Yung | 713/201 |
| 5,926,176 * | 7/1999 | McMillan et al. | 345/339 |
| 6,064,401 * | 5/2000 | Holzman et al. | 345/440 |
| 6,108,800 * | 8/2000 | Asawa | 714/47 |
| 6,122,740 * | 9/2000 | Anderson | 713/200 |
| 6,158,009 * | 12/2000 | Ayukawa | 713/201 |

* cited by examiner

Primary Examiner—Marc S. Hoff
Assistant Examiner—Khoi Hung Duong
(74) Attorney, Agent, or Firm—Hayes, Soloway, Hennessey, Grossman & Hage, P.C.

(57) ABSTRACT

A site access log analyzing method of analyzing and grasping how a site is utilized by users which is provided in a server on a computer network to which a plurality of computers are connected through a communication cable, the method comprising the step of transferring access logs to a server in response to the request of the server and time sequentially storing them in a memory of a computer of the site users. With this arrangement, even if a user moved to a plurality of servers, the access log information thereof is time sequentially stored in the user's computer. Thus, site managers can grasp how the user has used content files and how the user has moved in the content files when necessary by transferring the access log information to the servers and storing it in them.

2 Claims, 6 Drawing Sheets

SITE ACCESS LOG ANALYZING METHOD AND METHOD OF DISPLAYING THE SAME

BACKGROUND OF THE INVENTION

1. Field of the Invention

The present invention relates to a site access log analyzing method of analyzing and grasping how user's computers have accessed and utilized various types of sites a provided on servers on a computer network, in particular, on Internet and a method of displaying the site analog log.

2. Description of the Related Art

Recently, various types of information has been put on sites provided in servers and presented to users in correspondence to an increase in an Internet population.

The manager of the sites attempt to obtain information as to the tastes and tends of the users by presenting the useful information to them so that the managers can obtain data for a company strategy, marketing and the like and find new customers.

It is necessary, however, to detect and analyze how the users have read and used the page files describing various types of contents between sites or in a site and to grasp how the users have utilized them in order to obtain the information as to the tastes and trends of the users. As a conventional method of detecting and analyzing how the page files have been used by users, there has been used a method of recording log files in servers based on the access information from the users and analyze the log files to thereby grasp how sites have been utilized.

It is necessary, however, to dynamically capture how the users have moved in the respective content files and returned therefrom in order to obtain the information as to the tastes and trends of users in more detail. When, however, the conventional method of using the log files in servers is used, it is difficult to dynamically grasp a content file and a server from which a user, who had accessed to a prescribed content file, has returned as well as it is impossible to time sequentially trace a user who has made reciprocating movements between prescribed content files in a site even if it is the same site, although it is possible to grasp quantitative information such as the total number of users who have accessed prescribed content files.

An object of the present invention made in view of the above problem is to provide a site access log analyzing method and a method of displaying the site analog log capable of grasping how respective content files have been utilized by users in sites between servers or in a server by dynamically detecting and analyzing how the sites have been utilized and displaying the result of analysis.

SUMMARY OF THE INVENTION

According to the present invention, a site access log analyzing method of analyzing and grasping how a site is utilized by users which is provided in a server on a computer network to which a plurality of computers are connected through a communication cable is characterized by comprising the step of transferring access logs to a server in response to the request of the server and time sequentially storing them in storing means of a computer of the site users to solve the above problem.

According to the characteristic, even if a user moves to a plurality of servers, the access log information thereof is time sequentially stored in the user's computer. Thus, site managers can grasp how the user has used content files and how the user has moved in the content files when necessary by transferring the access log information to the servers and storing it in them.

In the site access log analyzing method of the present invention, it is preferable that the access logs stored in the storing means include a plurality of items such as time information, finding time information, region information and the like and items to be stored in the storing means can be designated by the server.

With this arrangement, since a site manager selects only the information he wants and sends it to a server and stores it therein, a storing capacity necessary to analysis can be minimized.

A site access log display method according to the present invention is characterized by comprising the step of displaying how side users have moved between page files in each site by arrows based on access log information transferred to a server in response to the request of the server and time sequentially stored in storing means of a computer of the site users as well as displaying the number of users who have executed the movements corresponding to the arrows.

With this arrangement, dynamic information as to how a user of a site has moved in a site and contents can be easily confirmed visually.

It is preferable that the thickness of the arrows is changed in proportion to the number of users who have executed the movements corresponding to the arrows.

With this arrangement, how a user has moved in content files can be grasped more visually.

DESCRIPTION OF THE PREFERRED EMBODIMENT

An embodiment of the present invention will be described below with reference to the drawings.

Figure 1:
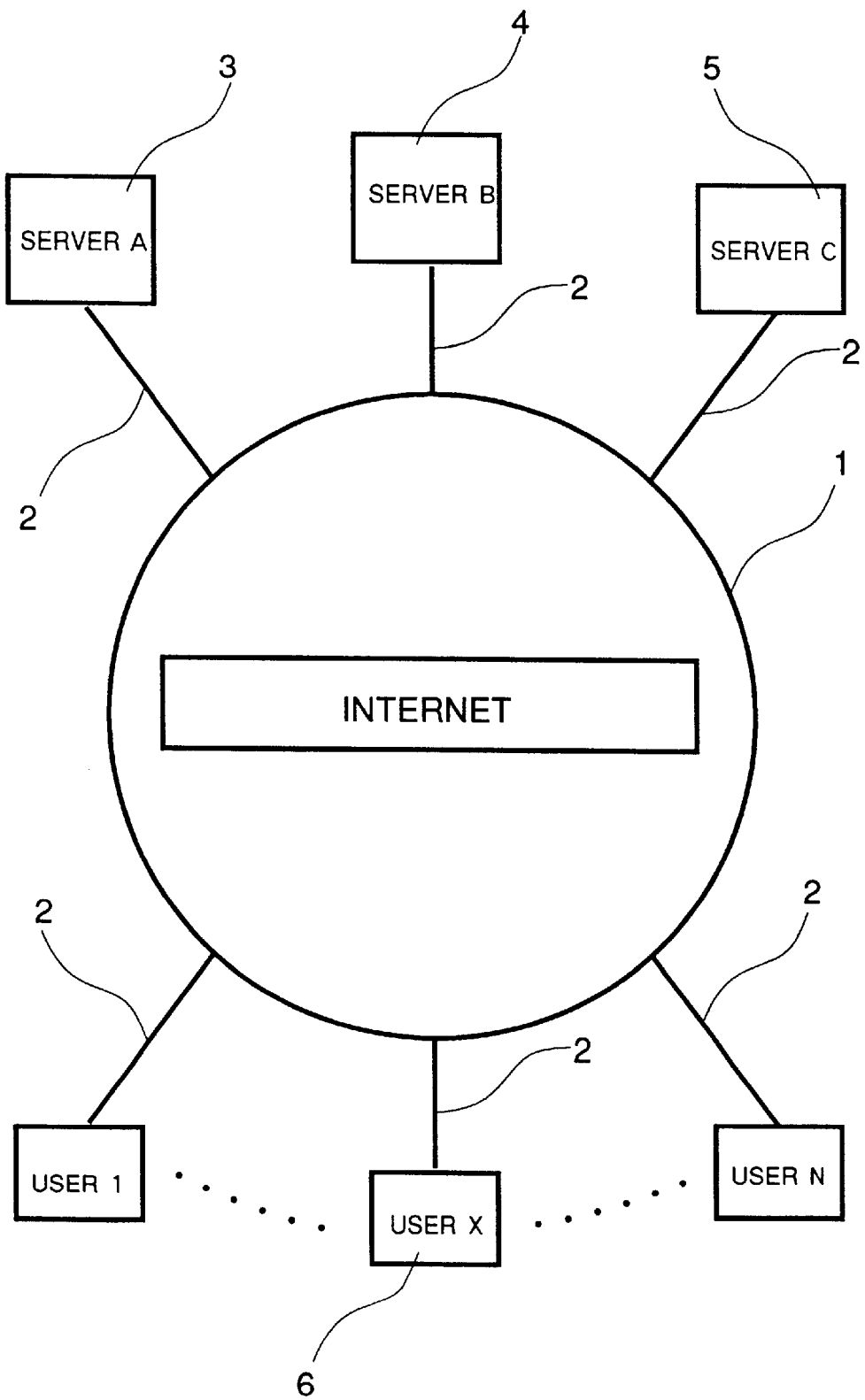
FIG. 1 is a conceptual diagram showing an arrangement of a computer network in an embodiment of the present invention.
Figure 2:
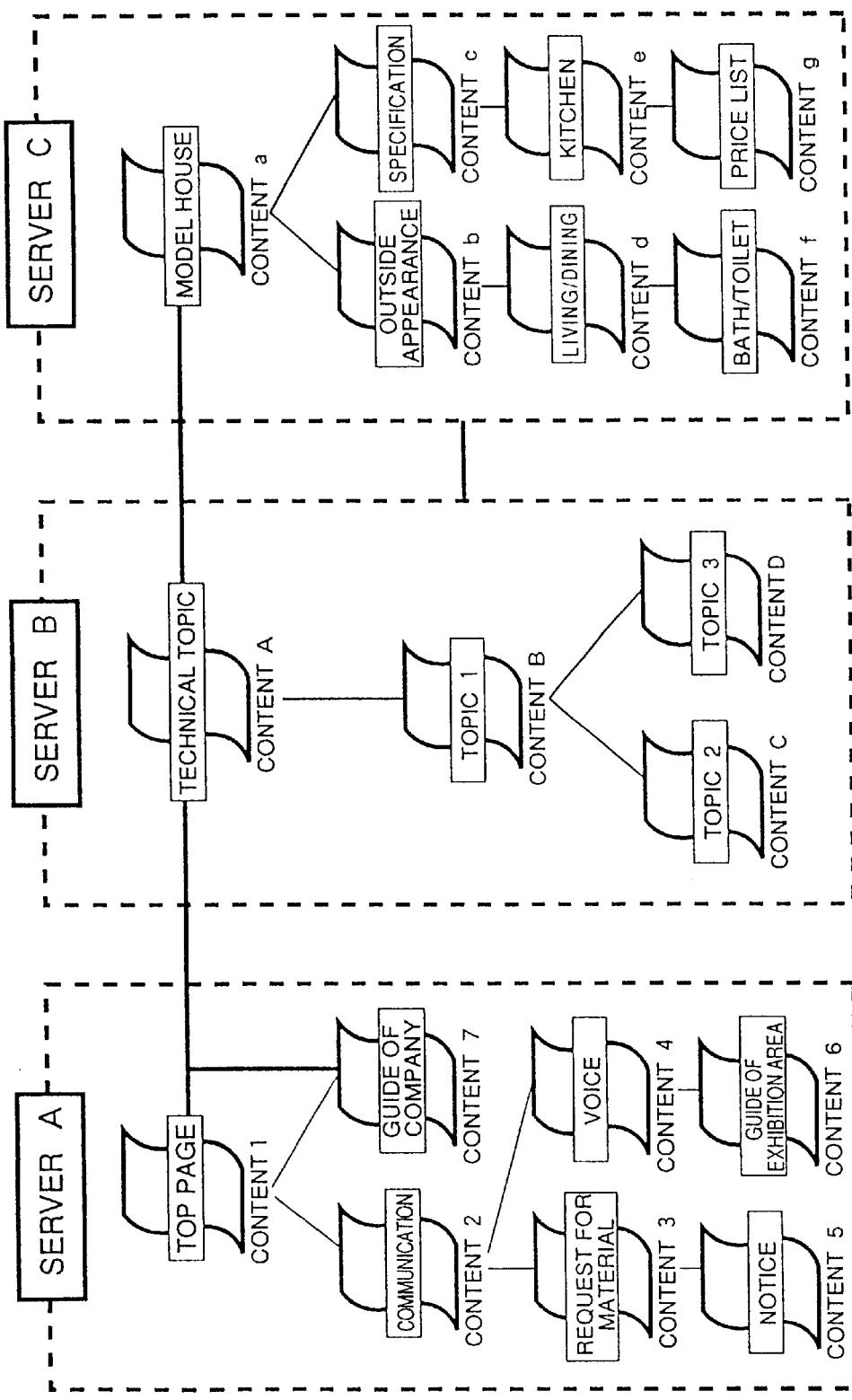
FIG. 2 is a block diagram showing how the contents of a site used by the embodiment is arranged.
Figure 3:
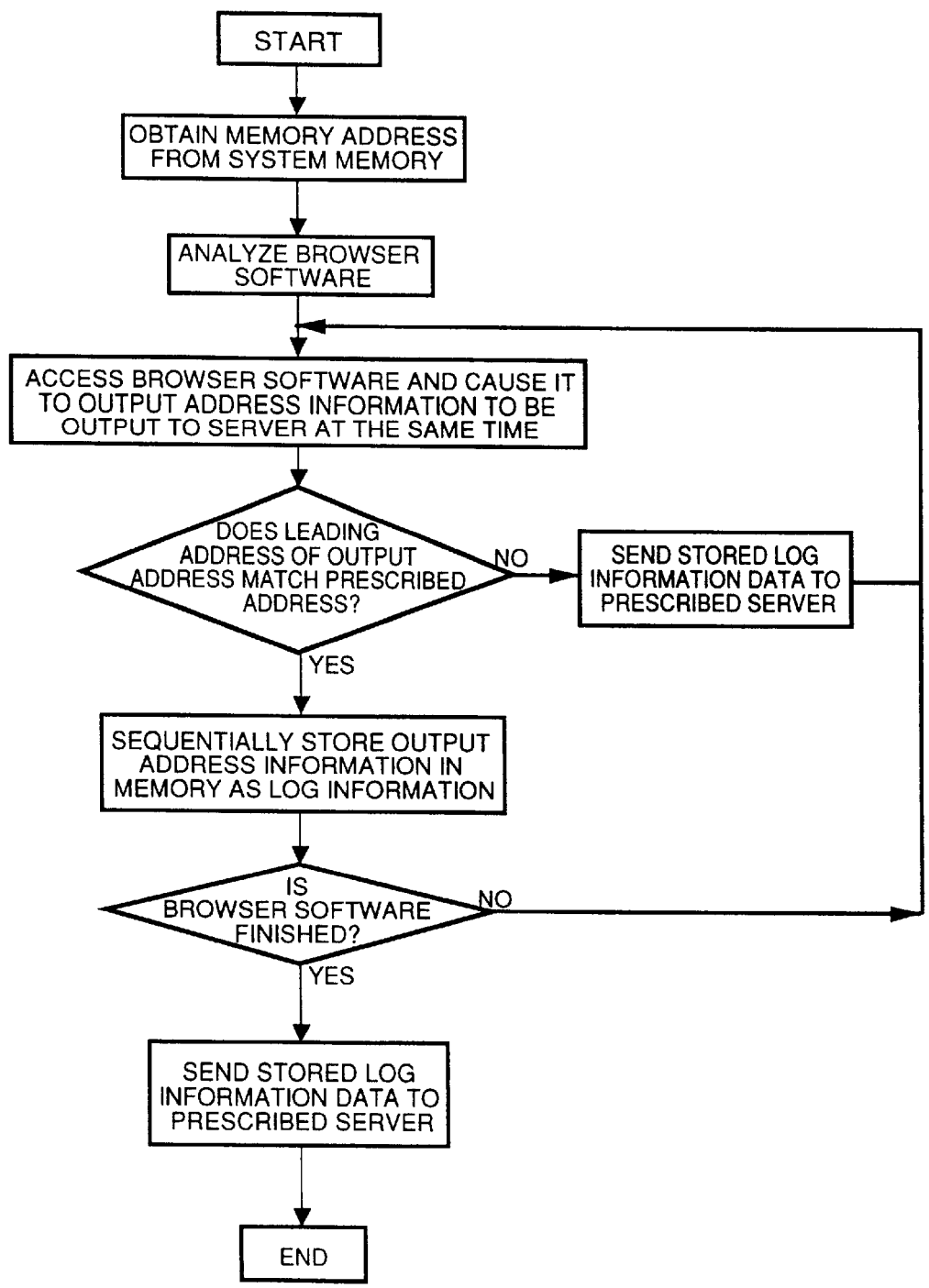
FIG. 3 is a flow diagram showing contents processed to realize an access log storing means which operates in a user's computer in the embodiment.
Figure 4:
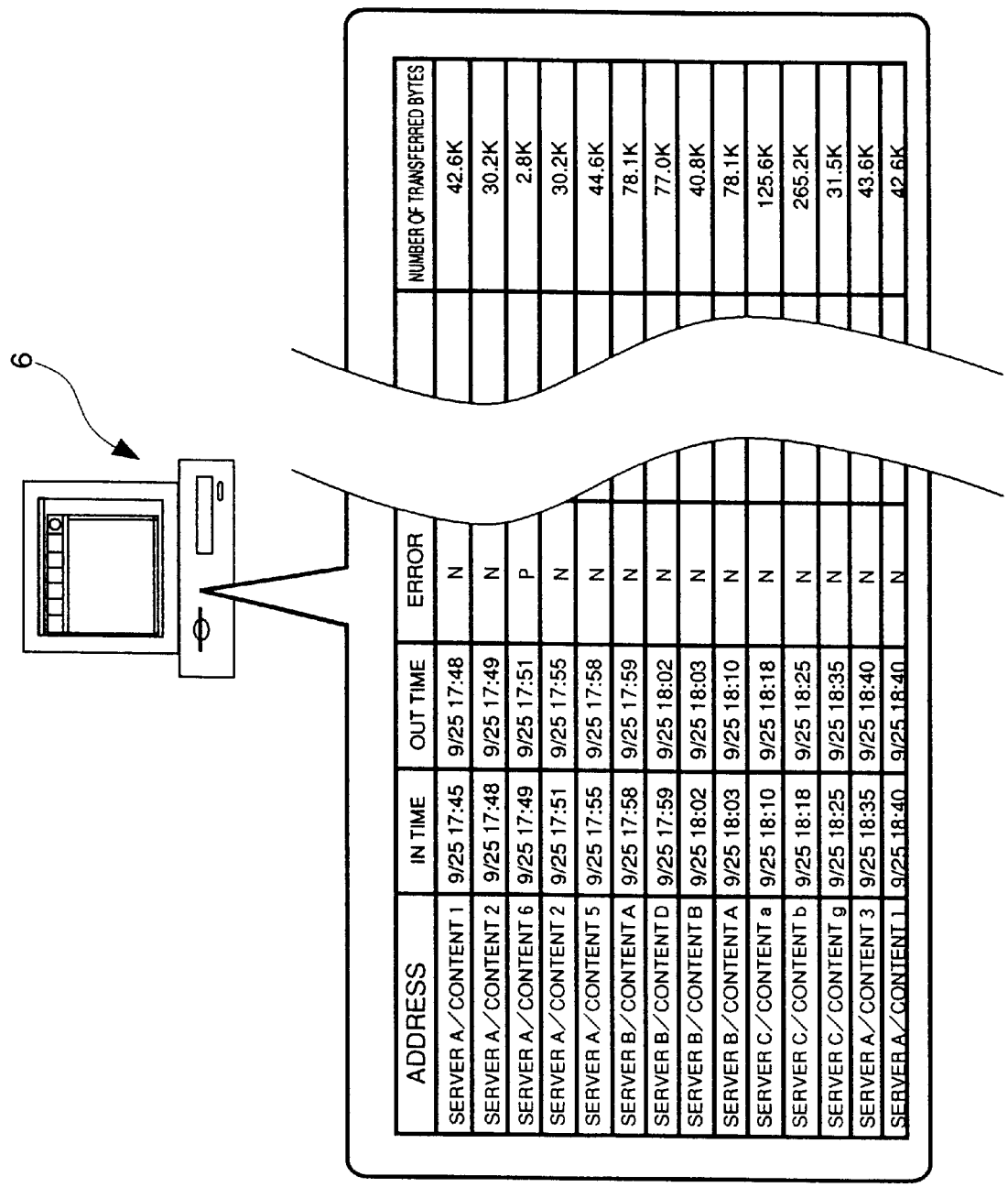
FIG. 4 is a conceptual diagram showing an example of a content stored in the storing means in the user's computer in the embodiment.
Figure 5:
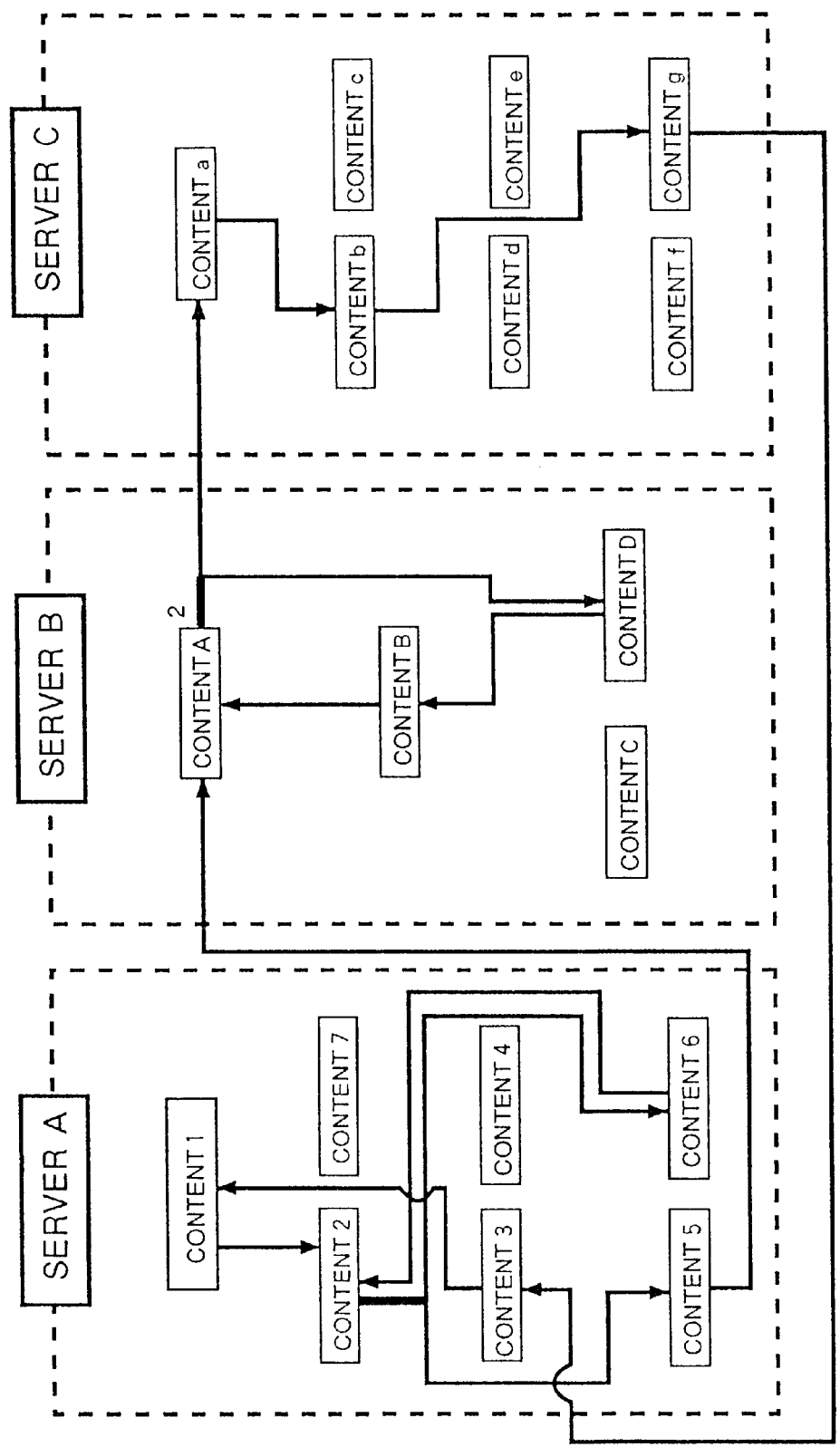
FIG. 5 shows an example displaying individual access logs in the embodiment.
Figure 6:
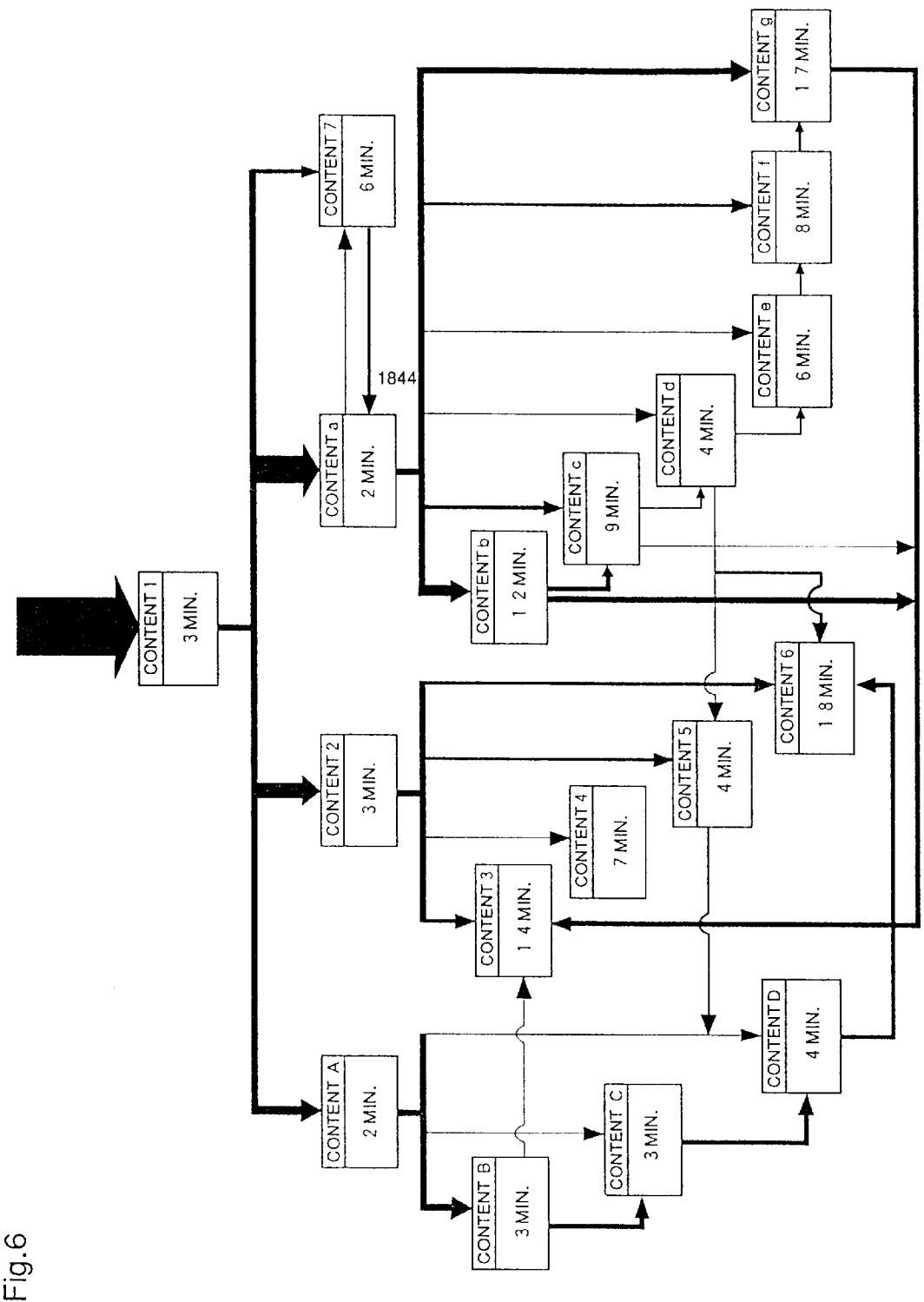
FIG. 6 shows an example displaying summed up access logs in the embodiment.

FIG. 1 is a conceptual diagram showing an arrangement of a computer network in an embodiment of the present invention, FIG. 2 is a block diagram showing how the contents of a site used by the embodiment is arranged, FIG. 3 is a flow diagram showing contents processed to realize an access log storing means which operates in a user's computer in the embodiment, FIG. 4 is a conceptual diagram showing an example of a content stored in the storing means in the user's computer in the embodiment, FIG. 5 shows an example displaying individual access logs in the embodiment and FIG. 6 shows an example displaying summed up access logs in the embodiment.

The embodiment is embodied by a network arrangement shown in FIG. 1, wherein a site used in the embodiment is composed of servers A 3, B 4 and C 5 and these respective servers are connected to an Internet network by individually provided communication units (not shown) through communication cables 2 so that a multiplicity of user's computers connected to Internet can access the respective servers.

A site in the embodiment composed of the servers A, B and C is arranged as shown in FIG. 2. The respective servers store content files 7 of respective categories which are described in HTML as the standard description language of World Wide Web (WWW). Since the site is arranged as a site for presenting housing information and the like in the embodiment, various types of information as to housing is presented to users as the respective content files 7. Since prescribed content files 7 are linked by a hyperlink, the users can easily move in the files.

In the embodiment, a processing program for realizing a storing means for temporarily storing access logs in the user's computers is transferred to the user's computers and operated therein in order to realize a storing means for time sequentially storing the access logs in the user's computers which access the housing information site. The processing program operates as shown in FIG. 3 and the content of the operation is mainly composed of a step of obtaining a memory address space for storing the record of access logs from a system memory in the user's computers, a step of analyzing browser application software for reading a site used by a user, a step of accessing the browser software and outputting the address information which is output to Internet by the browser software also to the processing program at the same time, a step of determining whether or not a site address as the leading address of the output address information matches the address of a site whose log must be record, a step of recording the address information, time information and the like of the site when they match each other and a step of sending the address information, time information and the like stored in the memory to a prescribed server.

An operation of the site access log analyzing method of the embodiment will be described below. First, when a user's computer, for example, a computer 6 of a user X connected to Internet as a computer network through the communication cable 2 accesses the content 1 of the server A 3 which is the top page of the housing information site used in the embodiment, a permission dialog for requesting permission for fetching the record of an access log is displayed on the computer 6. When the user X permits to fetch the record, the above processing program is transferred to the computer 6 from the server A 3 and the processing program is started.

It is preferable that the processing program transferred to the computer 6 of the user and started therein is applicable to the type of the user's computer and the operation system (hereinafter, abbreviated as "OS") used by the user. Since, however, a plurality of processing programs must be prepared in this case, it is preferable that these processing programs are described in a program language which permits the processing programs to operate in a different OS environment so that they can operate in a multi-platform. Java (a trademark of Sun Micro Systems) and the like are exemplified as the program language.

Subsequently, the processing program started in the computer 6 of the user analyzes the browser software used by the user as shown in FIG. 3 and indicates that the browser software outputs the address information, which is output to respective servers by it through Internet, also to the processing program.

A site address at the leading edge of the address information output from the browser software based on the indication is compared with a permitted prescribed site address by the processing program to determine whether the output address is the address which has been permitted to record the access log or not. When the site address matches the prescribed site address permitted, the time information and the like of the site are sequentially stored in the memory together with the address information as shown in FIG. 4.

The address information, time information and the like stored in the memory as described above are transferred as access log information to a prescribed server, for example, the server A 3 in the embodiment at prescribed timing, for example, when the access of the user moves from a prescribed site or when the browser software is finished in the embodiment.

Since the thus transferred access log information is stored in the server A 3, it can be found how the user X has moved in the respective content files 7 in the site based on the address information and time information described in the access log information. Therefore, even if the user X moves over a plurality of servers, the state of the movement and the destinations to which the user X has moved can be securely grasped because the information is held in the computer 6 of the user.

FIG. 5 shows how the user X has moved in the content files 7 based on the access log information. The time sequential record of the address information permits to dynamically grasp how the user X have moved in and returned from the respective content files 7. Further, when the directions in which the user X has moved in the respective content files 7 are shown by arrows and the number of times of the movements is shown by figures besides the arrows, it can be visually grasped how the user X has moved in the site and what contents the user X is interested in.

FIG. 6 shows an example of statistical analysis of the access log information sent from many and unspecified persons.

As shown in FIG. 6, the embodiment shows how the respective users have moved in the content files 7 and how long they have stayed in the respective content files 7 on average. The arrows showing the moving directions of the users have a different thickness in proportion to the number of users executed the movements.

Since the flow of the movements of the users in the site can be grasped by the arrangement as described above, it is possible to visually obtain information necessary to construct a site which permits users to more easily fetch information more necessary to them; to specify a particular content file 7 to which accesses are concentrated and delayed by multiple access; and to visually grasp the information in which the users are interested and a process through which the user obtain the information.

Although the embodiment uses Internet as the computer network, the present invention is not limited thereto and is applicable to any other computer network.

Information other than the address information and time information such as the number of transferred bytes which was not described above may be also stored in the memory by the processing program and transferred in the embodiment.

When the arrows, respective contents 7 and the like are displayed based on the access log information, they may be arbitrarily displayed by being classified by colors according to their types.

Although the embodiment has been described above with reference to the drawings, the present invention is by no means limited to the above embodiment and it goes without saying that any modification and addition can be included in the present invention so long as they do not depart from the gist of the invention.

The present invention achieves the following advantages.

(a) According to a first aspect of the invention, even if a user moves to a plurality of servers, the access log information thereof is time sequentially stored in the user's computer. Thus, site managers can grasp how the user has used content files and how the user has moved in the content files when necessary by transferring the access log information to the servers and storing it in them.

(b) According to a second aspect of the invention, since a site manager selects only the information he wants and sends it to a server and stores it therein, a storing capacity necessary to analysis can be minimized.

(c) According to a third aspect of the invention, dynamic information as to how a user of a site has moved in a site and contents can be easily confirmed visually.

(d) According to a fourth aspect of the invention, how a user has moved in content files can be grasped more visually.

What is claimed is:

1. A site access log display method, comprising the step of displaying how site users have moved between page files in each site by arrows based on access log information transferred to a server in response to the request of the server and time sequentially stored in storing means of a computer of the site users as well as displaying the number of users who have executed the movements corresponding to the arrows.

2. A site access log display method according to claim 1, wherein the thickness of the arrows is changed in proportion to the number of users who have executed the movements corresponding to the arrows.

* * * * *